United States Patent
Tamura et al.

(10) Patent No.: US 8,668,044 B2
(45) Date of Patent: Mar. 11, 2014

(54) TRANSPORTER VEHICLE (75) Inventors: Katsumi Tamura, Omitama (JP); Kazumasa Horii, Toyonaka (JP); Knud Jensen Meldgaard, Nordborg (DK)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 251 days.

(21) Appl. No.: 13/203,276

(22) PCT Filed: Jul. 1, 2010

(86) PCT No.: PCT/JP2010/061240
§ 371 (c)(1),
(2), (4) Date: Aug. 25, 2011

(87) PCT Pub. No.: WO2011/002053
PCT Pub. Date: Jan. 6, 2011

(65) Prior Publication Data
US 2011/0308882 A1    Dec. 22, 2011

(30) Foreign Application Priority Data

Jul. 2, 2009 (JP) ................................. 2009-157879

(51) Int. Cl.
*B62D 5/08* (2006.01)
(52) U.S. Cl.
USPC .............................. 180/441; 60/494; 180/442
(58) Field of Classification Search
USPC ............ 180/417, 441, 442, 418, 428; 91/375, 91/443; 60/494, 431, 329
See application file for complete search history.

(56) References Cited

U.S. PATENT DOCUMENTS

| | | | | |
|---|---|---|---|---|
| 5,320,191 A * | 6/1994 | Sudo et al. | ..................... | 180/442 |
| 6,138,789 A * | 10/2000 | Eberhart et al. | ............. | 180/428 |
| 6,216,813 B1 * | 4/2001 | Sonoda et al. | ................ | 180/421 |
| 6,637,542 B2 * | 10/2003 | Cho | ............................. | 180/441 |
| 7,827,785 B2 * | 11/2010 | Messerlie et al. | ............... | 60/329 |
| 2006/0237256 A1 * | 10/2006 | Sasaki et al. | .................. | 180/442 |
| 2009/0145121 A1 * | 6/2009 | Yasuda et al. | .................. | 60/431 |
| 2010/0101888 A1 | 4/2010 | Nakamura et al. | | |

FOREIGN PATENT DOCUMENTS

| | | |
|---|---|---|
| EP | 2 112 052 A1 | 10/2009 |
| JP | 62-151179 U | 9/1987 |
| JP | 2003-278710 A | 10/2003 |
| JP | 2006-264423 A | 10/2006 |
| JP | 2008-179278 A | 8/2008 |

* cited by examiner

*Primary Examiner* — Anne Marie M Boehler
(74) *Attorney, Agent, or Firm* — Mattingly & Malur, PC (57) ABSTRACT

There is provided a circulation line (39) for circulating pressurized oil from an accumulator (11) into a housing (15) of a steering valve (14). An orifice joint (41) is provided along the path of the circulation line (39). The orifice joint (41) is removably mounted on the housing (15) of the steering valve (14) from outside. An orifice portion (42) of the orifice joint (41) applies a throttling function to the circulating oil liquid whereby a frictional heat is generated therein. The oil liquid in a warm state flows through a communication passage (21), passages in a spool valve (16), and a low pressure side passage (18B), thus enabling the steering valve (14) to be always in a warm state.

4 Claims, 5 Drawing Sheets

TRANSPORTER VEHICLE

TECHNICAL FIELD

The present invention relates to a transporter vehicle which is suitably used in transporting crushed stones or earth and sand excavated from an open-pit stope, a stone quarry, a mine or the like.

BACKGROUND ART

Generally, a large-sized transporter vehicle called a dump truck has a liftable vessel (loading platform) on a frame of a vehicle body. The large-sized transporter vehicle carries objects to be transported such as crushed stones or earth and sand in a state where the objects to be transported are loaded in a large quantity on the vessel (for example, Japanese Patent Laid-Open No. 2006-264423 A).

A transporter vehicle of this type according to the conventional art comprises an automotive vehicle body, a vessel which is provided on the vehicle body in such a manner as to be tiltable (liftable) thereon by using a rear side of the vehicle body as a fulcrum and on which objects to be transported are loaded, an operating room provided in the vehicle body to be positioned on the front side of the vessel, and the like. A steering handle is provided in the operating room of the transporter vehicle, and a driver grips the steering handle to steer a travelling direction of the vehicle.

The transporter vehicle of the conventional art is equipped with a power steering apparatus constructed to perform a steering operation of a vehicle using a hydraulic force for being able to assist a handle operation of a driver. This power steering apparatus is constructed by including a steering valve for controlling a direction and a flow amount of pressurized oil supplied to a steering cylinder at the time of being changed from a neutral position to a changeover position by a steering handle, a circulation line for circulating an oil liquid in the steering valve when the steering valve is in the neutral position.

In this case, a stationary orifice is provided in the steering valve to be positioned along the path of the circulation line. This stationary orifice applies a throttling function to the oil liquid circulating in the steering valve when the steering valve is in the neutral position to generate a frictional heat for keeping the steering valve to be always in a warm state, thus protecting the steering valve from a so-called heat shock.

SUMMARY OF THE INVENTION

Incidentally, the transporter vehicle according to the aforementioned conventional art is constructed such that the stationary orifice is provided in the housing of the steering valve. Therefore, when the stationary orifice is blocked by foreign objects contained in the oil liquid, the oil liquid can not be circulated. For eliminating this state, the necessity of performing a cleaning operation to the deep side of the housing occurs, thus requiring a troublesome task.

Therefore, according to the conventional art, for omitting the cleaning operation requiring time and labors, an orifice diameter of the stationary orifice is made large on some degree, thus preventing occurrence of clogging of the foreign objects in the stationary orifice. However, incase the diameter of the stationary orifice is made large, it is difficult to keep the steering valve to be always in a warm state unless a flow amount of the oil liquid flowing in the circulation line is increased.

In a hydraulic circuit of a steering system using an accumulator as a hydraulic pressure source, a capacity of the accumulator is required to increase for increasing the flow amount of the oil liquid flowing in the circulation line. In a case of thus compensating for an increasing amount of the oil amount using the accumulator having a large capacity, there occurs a problem that the compensation will be a large obstacle to achieve an energy saving.

The present invention is made in view of the foregoing problems of the conventional art and it is an object of the present invention to provide a transporter vehicle which can control an oil amount passing through a steering valve in a neutral position to the necessary minimum to reduce a capacity of an accumulator to be small, thus keeping the steering valve to be always in a warm state, as well as improving operability at maintenance.

(1) In order to solve the above-described problems, the present invention is applied to a transporter vehicle comprising an automotive vehicle body, a vessel which is tiltably provided on the vehicle body by using a rear side of the vehicle body as a fulcrum and on which objects to be transported are loaded, an operating room provided in the vehicle body to be positioned in the front side of the vessel, a steering handle provided in the operating room and steered by a driver, a steering valve for controlling a direction and a flow amount of pressurized oil supplied to a steering cylinder at the time of being operated and changed from a neutral position by a steering handle, and a circulation line for circulating an oil liquid in the steering valve when the steering valve is in the neutral position.

The characteristic feature of the construction adopted by the present invention lies in that: an orifice member being provided along the path of the circulation line to be removably mounted to an outer side face of the steering valve for applying a throttling function to the flowing oil liquid.

By adopting such a construction, when foreign objects contained in the oil liquid flowing in the circulation line deteriorate a flow of the oil liquid passing through the orifice member even by a little, the orifice member can be easily removed from the outer side face of the steering valve to cope with such a situation, thus preventing the passage of the orifice member from being blocked due to the foreign objects.

In consequence, an orifice diameter of the orifice member can be set so small as to control the flow amount of the oil liquid passing at a neutral position of the steering valve to the necessary minimum to keep the steering valve to be always in a warm state. Further, it is not necessary to increase the capacity of the accumulator to be as large as in the conventional art, and therefore, an accumulator having the minimized capacity as needed can be used, thus achieving the energy saving.

(2) According to the present invention, the orifice member is screwed into the housing of the steering valve from outside to be mounted thereon.

With this construction, the orifice member can be screwed into the housing of the steering valve from outside to be mounted thereon, thus facilitating mounting and removing operations of the orifice member. Therefore, the maintenance operation for preventing the passage of the orifice member from being blocked by the foreign objects can be easily performed from outside of the housing, realizing an efficient maintenance in a short time.

(3) According to the present invention, the orifice member is constituted by an orifice joint including an orifice portion for applying a throttling function to the flowing oil liquid, and a filter positioned upstream of the orifice portion to purify the oil liquid.

According to the above-described construction, the filter arranged upstream of the orifice portion can remove the foreign objects contained in the oil liquid, thus preventing the foreign objects from entering into the orifice portion. At maintenance, a cleaning operation of the filter and the like may be performed in a state where the orifice joint is removed from the steering valve. Therefore, the clogging by the foreign objects can be simply prevented, thus improving the operability.

(4) According to the present invention, the steering valve includes a high pressure side passage connected to an accumulator for accumulating the pressurized oil through a supply line, and a low pressure side passage connected to a tank through an exhaust pipe, and the circulation line includes a branch line which is branched from the supply line and a front end side of which is connected to the orifice member, the orifice member, a communication passage provided in the steering valve to communicate an inside of the orifice member with the low pressure side passage, and the exhaust line connected to the low pressure side passage for circulating the pressurized oil from the accumulator into the steering valve.

In consequence, after the circulation line flows the oil liquid by the pressurized oil from the accumulator into the orifice member through the branch line branched from the supply line when the steering valve is in the neutral position, the circulation line can flow the oil liquid from the low pressure side passage to the exhaust line through the communication passage provided in the steering valve. Thereby, while the steering valve is in the neutral position, the oil liquid supplied from the accumulator can be circulated in the steering valve to keep the steering valve to be always in a warm state.

(5) According to the present invention, a flow amount amplifying valve is provided between the accumulator for accumulating the pressurized oil and the steering cylinder, wherein when the steering valve is changed from the neutral position to a changeover position by the operation of the steering handle, the flow amount amplifying valve is changed from the neutral position to the changeover position using the pressurized oil supplied from an output side passage of the steering valve as a pilot pressure, and the flow amount amplifying valve combines the pressurized oil supplied from the output side passage of the steering valve and the pressurized oil supplied from the accumulator at the time of being changed from the neutral position to the changeover position and supplies the combined pressurized oil with the increased flow amount toward the steering cylinder through a main line.

With this construction, when the steering valve is changed from the neutral position to the changeover position by the operation of the steering handle, the flow amount amplifying valve can be changed from the neutral position to the changeover position to supply the pressurized oil with the increased flow amount to the steering cylinder through the main line. Therefore, an expanding or contracting speed of the steering cylinder can be increased to enhance responsiveness of the steering cylinder at the time of operating the steering handle.

MODE FOR CARRYING OUT THE INVENTION

Hereinafter, a transporter vehicle according to an embodiment of the present invention will be explained in greater detail with reference to FIG. 1 to FIG. 6 of the accompanying drawings, by citing as an example a dump truck transporting crushed stones excavated in a mine.

Figure 1:
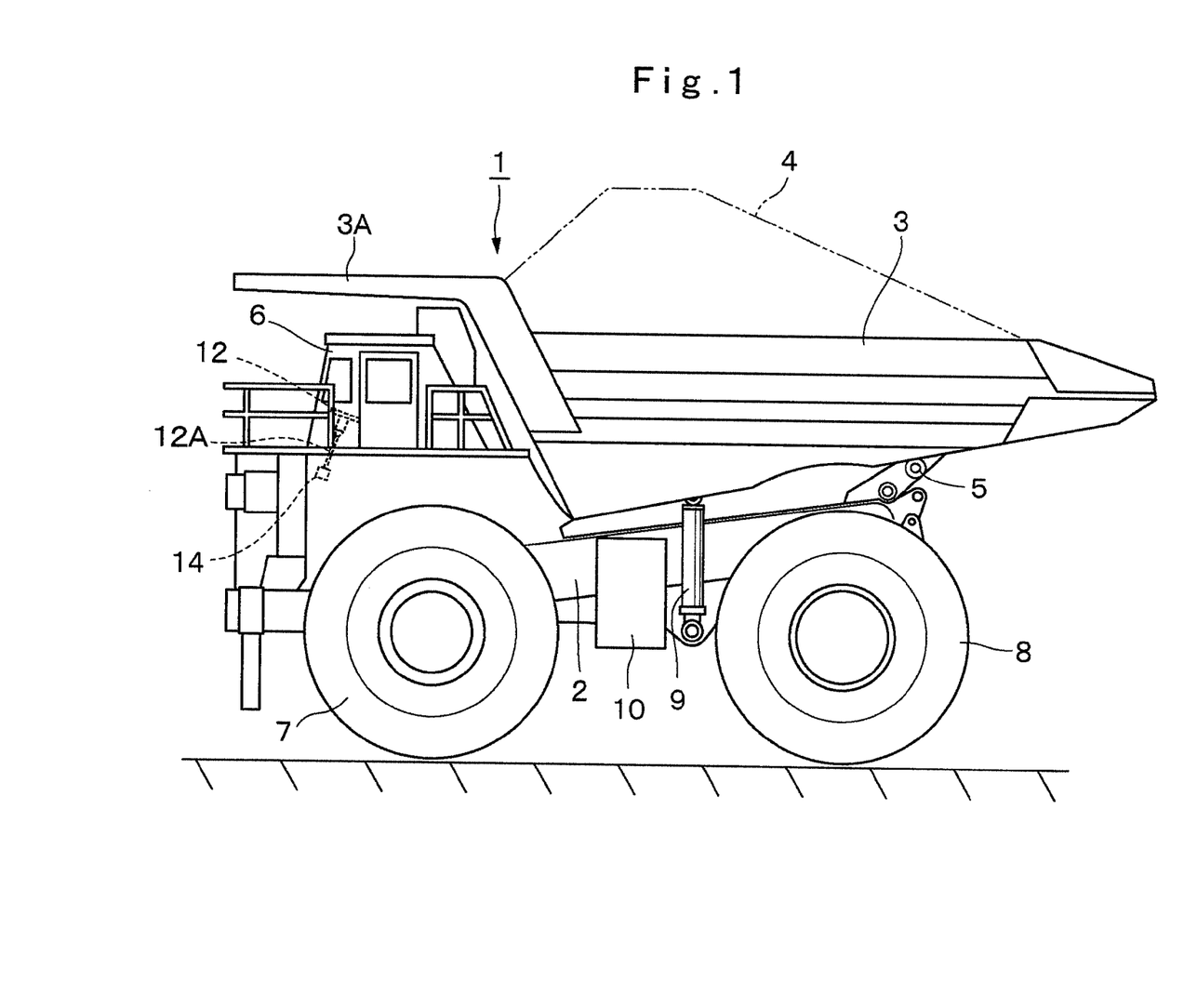
FIG. 1 is a front view showing a dump truck according to an embodiment in the present invention.

In the figure, designated at 1 is a dump truck which is a large-sized transporter vehicle. As shown in FIG. 1, the dump truck 1 is largely constituted by a vehicle body 2 having a rigid frame structure and a vessel 3 used as a loading platform tiltably (liftably) mounted on the vehicle body 2 by using a rear side of the vehicle body 2 as a fulcrum.

The vessel 3 is formed as a large-sized container whose overall length reaches as much as 10 to 13 meters to load a large volume of objects to be transported such as crushed stones (hereinafter, called crushed stones 4). A rear side bottom portion of the vessel 3 is tiltably coupled to a rear end side of the vehicle body 2 by using a connecting pin 5 and the like. A protector 3A is integrally provided on a front side top portion of the vessel 3 in such a manner as to cover a cab to be described later from an upper side thereof.

Namely, the bottom portion side of the vessel 3 is rotatably supported by the rear portion side of the vehicle body 2 by using the connecting pin 5. Further, as a hoist cylinder 9 to be described later is expanded or contracted, the front portion side (protector 3A side) of the vessel 3 is rotated in the upward or downward direction (raised or lowered) by the use of the connecting pin 5 as a fulcrum.

Denoted at 6 is the cab which is provided in the front portion of the vehicle body 2 to be located at the front side of the vessel 3. The cab 6 defines an operating room where a driver of the dump truck 1 gets in/off. A driver's seat, an activation switch, an accelerator pedal, a brake pedal (any thereof is not shown), a steering handle 12 to be described later (refer to FIG. 2 and FIG. 3), and the like are provided inside the cab 6. The protector 3A of the vessel 3 mostly covers the cab 6 from the upper side, thus protecting the cab 6 from flying stones containing rocks, as well as providing a function of protecting the driver in the cab 6 also at the time the dump truck 1 falls down or the like.

Indicated at 7 are left and right front wheels (only one is shown) which are provided rotatably at the front portion side of the vehicle body 2, and the front wheel 7 is formed with a tire diameter (outside diameter dimension) of, for example, as much as 2 to 4 meters in the same way as rear wheels 8 to be described later. The left and right front wheels 7 are steered followed by the expanding or contracting operation of the steering cylinders 22A and 22B (refer to FIG. 2) when a driver of the dump truck 1 operates the steering handle 12 to be described later.

Indicated at 8 are left and right rear wheels (only one is shown) which are rotatably provided at the rear portion side of the vehicle body 2, and the rear wheels 8 constitute drive wheels of the dump truck 1 which are rotatively driven by a traveling drive unit (not shown). The dump truck 1 travels on a road by rotation of the rear wheel 8.

Denoted at 9 are a pair of left and right hoist cylinders (only one is shown in FIG. 1) telescopically provided between the vehicle body 2 and the vessel 3. This hoist cylinder 9 is formed of a multi-stage (for example, three-stage) hydraulic cylinder. The hoist cylinder 9 expands in upward and downward directions. In consequence, the hoist cylinder 9 tilts the vessel 3 diagonally backward and upward by using the connecting pin 5 as a fulcrum. On the other hand, at the time the hoist cylinder 9 is contracted, the vessel 3 bows downward by using the connecting pin 5 as a fulcrum to be rotated to a transporting position shown in FIG. 1.

Indicated at 10 is an operating oil tank (hereinafter, called tank 10) mounted on a side face of the vehicle body 2 to be positioned under the vessel 3. The operating oil tank 10 receives an operating oil inside it. When a hydraulic pump is driven by an engine (both are not shown), an oil liquid in the operating oil tank 10 is highly pressurized to be discharged and supplied to the hoist cylinder 9 and the like. Further, the pressurized oil from the hydraulic pump is also supplied to an accumulator 11 to be described later.

Next, the hydraulic circuit for steering used in the present embodiment will be explained with reference to FIG. 2 and FIG. 3.

Denoted at 11 is the accumulator constructing a hydraulic pressure source of the hydraulic circuit for steering together with the operating oil tank 10. The accumulator 11 accumulates the pressurized oil discharged from the hydraulic pump and supplies the accumulated pressurized oil toward a steering valve 14 and steering cylinders 22A and 22B to be described later. A pressure of the pressurized oil in the accumulator 11 is held within a predetermined pressure range using a pressure adjuster (not shown) or the like.

Here, when the pressure in the accumulator 11 is reduced to the lower limit pressure of the pressure adjuster, the pressurized oil from the hydraulic pump is resupplied into the accumulator 11. Meanwhile, when the pressure in the accumulator is increased to the upper limit pressure of the pressure adjuster, the resupply of the pressurized oil from the hydraulic pump into the accumulator 11 is stopped. Therefore, the pressure in the accumulator 11 is held within the predetermined pressure range.

Denoted at 12 is the steering handle (hereinafter, called handle 12) provided in the cab 6 shown in FIG. 1 and steered by a driver. The driver grips the handle 12 and rotates a handle shaft 12A in the right or left side to perform a steering operation of the vehicle. As shown in FIG. 2 and FIG. 3, a hydraulic pump motor 13 is connected to the handle shaft 12A of the handle 12. As a result, in the handle 12, a reaction to be generated at handle operating can be reduced by rotation of the hydraulic pump motor 13 to alleviate an operational feeling.

Designated at 14 is the steering valve adopted in the present embodiment. As shown in FIG. 2 and FIG. 3, the steering valve 14 is constituted by including a valve housing 15 (hereinafter, called housing 15) and a spool valve 16 formed of a directional control valve provided in the housing 15. In this case, the spool valve 16 is connected to the handle shaft 12A and is operated to change in position in response to a rotational operation of the handle 12.

Figure 3:
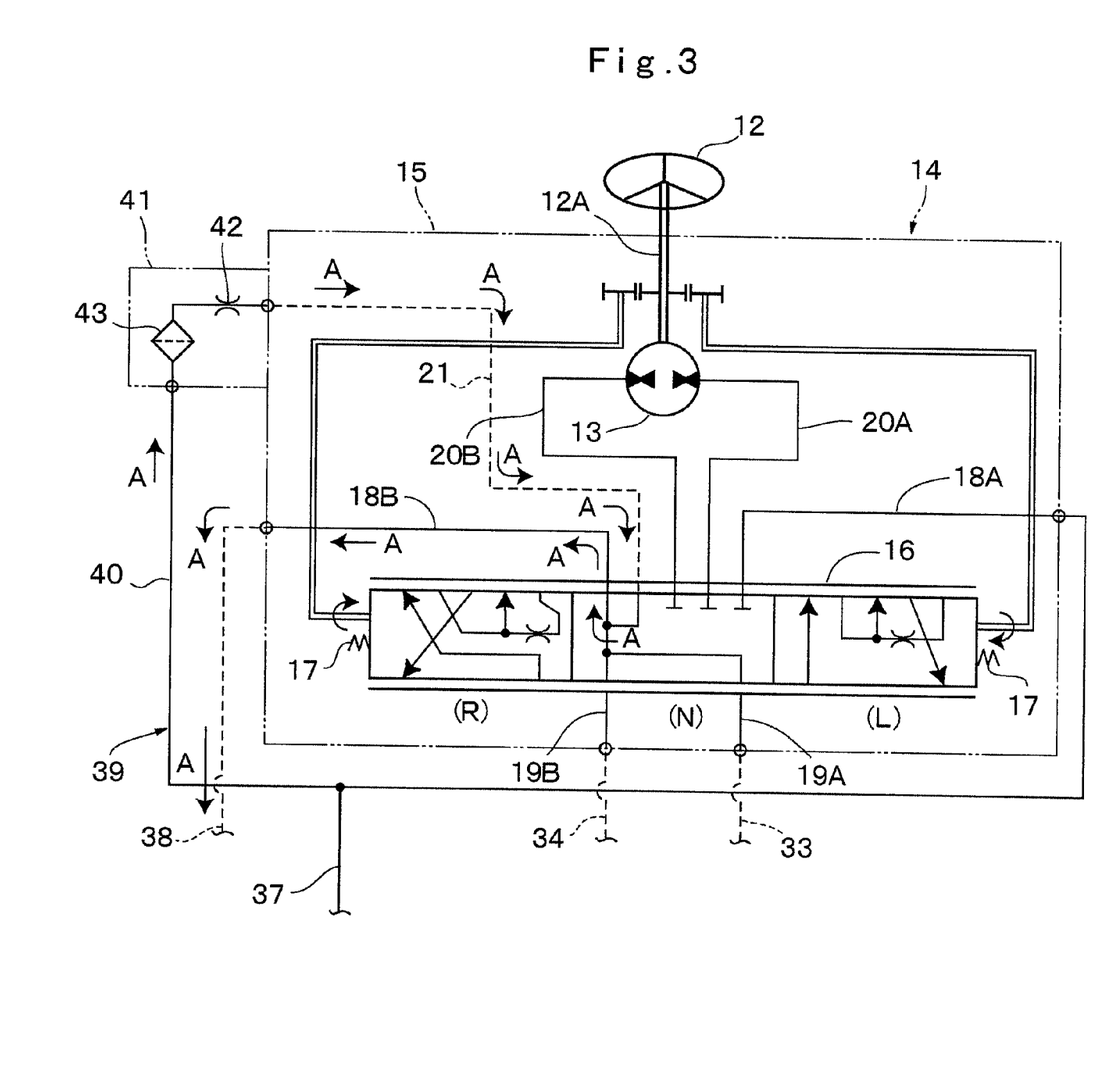
FIG. 3 is the hydraulic circuit diagram shown by enlarging a steering valve and the like in FIG. 2.

Namely, the spool valve 16 of the steering valve 14 is changed from a neutral position (N) to a right or left changeover position (R), (L) shown in FIG. 3 in response to a rotational operation of the handle 12. When the rotational operation of the handle 12 is stopped, the spool valve 16 is returned to the neutral position (N) by a plate spring 17.

Here, a high pressure side passage 18A to which the pressurized oil from the accumulator 11 is supplied through a supply line 37 to be described later and the like, a low pressure side passage 18B connected to the tank 10 through a discharge line 38 to be described later and the like, and a pair of output side passages 19A and 19B connected selectively to any of the high pressure side passage 18A and the low pressure side passage 18B through the spool valve 16 are provided in the housing 15 of the steering valve 14.

A pair of main passages 20A and 20B are provided between the hydraulic pump motor 13 and the spool valve 16. When the spool valve 16 is changed from the neutral position (N) to the right or left changeover position (R), (L), one of the main passages 20A and 20B is connected to the high pressure side passage 18A and the pressurized oil from the high pressure side passage 18A flows through the main passages 20A and 20B.

At this time, the hydraulic pump motor 13 is rotated in a direction of assisting an operation of the handle 12 by supply of the pressurized oil from the high pressure side passage 18A through the main passages 20A and 20B. That is, the hydraulic pump motor 13 is rotatively driven by the pressurized oil flowing in the main passages 20A and 20B to give a supplementary power in the same direction as an operational direction of the handle 12 to the handle 12.

Denoted at 21 is a communication passage provided in the housing 15 of the steering valve 14. The communication passage 21 is formed between an orifice joint 41 to be described later and the spool valve 16 and the communication passage 21 constitutes apart of a circulation line 39 to be described later. The communication passage 21 flows an oil liquid circulating in an arrow A direction in FIG. 3 from a side of the orifice joint 41 to be described later into the spool valve 16, and has a function of keeping the spool valve 16 to be always in a warm state by this oil liquid.

Figure 4:
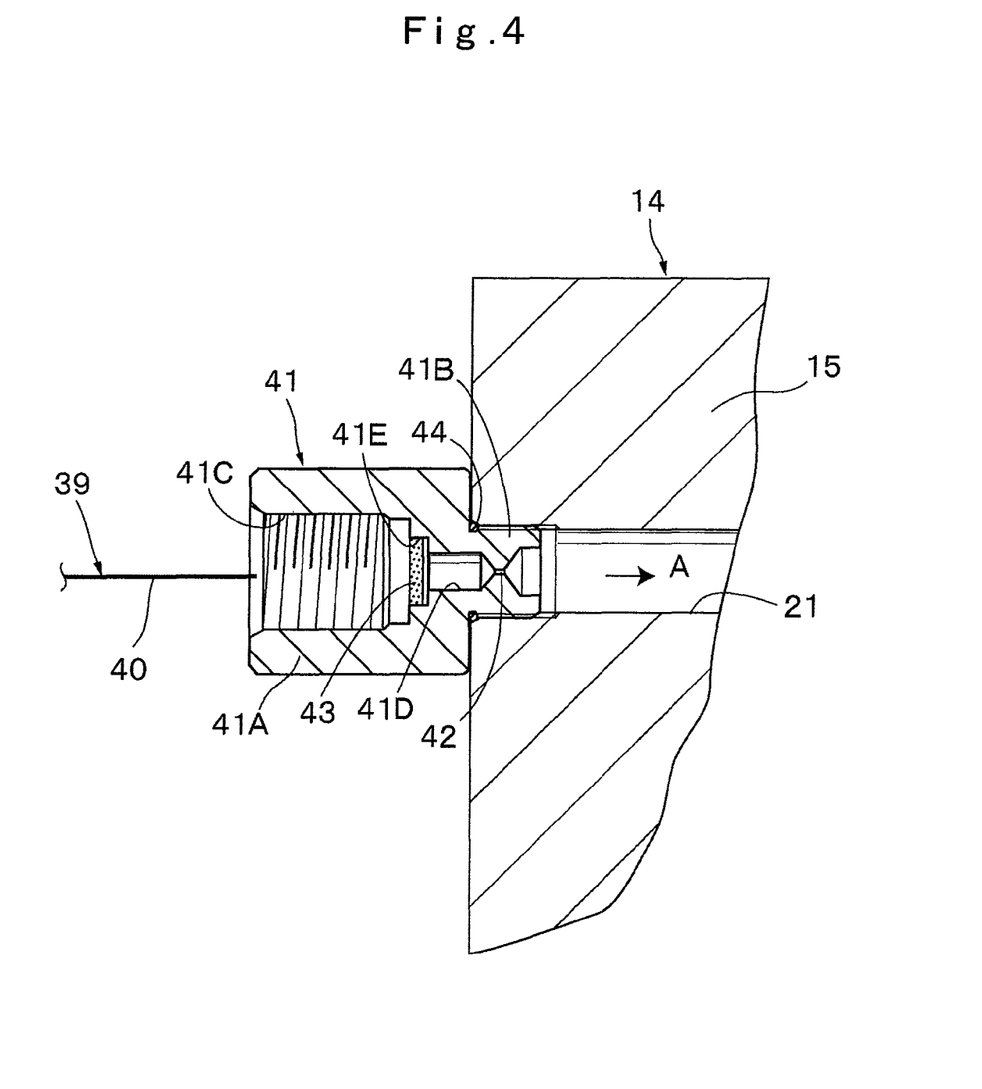
FIG. 4 is a cross-sectional view of essential portions showing an orifice joint provided to be screwed into a housing of the steering valve.

In this case, the communication passage 21 is formed of a passage hole drilled in the housing 15 of the steering valve 14 as exemplified in FIG. 4 and an end portion thereof is opened to an outer side face of the housing 15. A male screw portion 41B of the orifice joint 41 to be described later is screwed into an open end side of the communication passage 21 and an O-ring 44 to be described later seals a space between an open end of the communication passage 21 and the orifice joint 41.

Denoted at 22A and 22B are the left and right steering cylinders adopted in the present embodiment. The respective steering cylinders 22A and 22B are provided in sides of the front wheels 7 shown in FIG. 1 to give a steering force by a hydraulic force to the left and right front wheels 7. Namely, as shown in FIG. 2, each of the left and right steering cylinders 22A and 22B, performs an expanding or contracting operation by supply of the pressurized oil from the accumulator 11 through the steering valve 14 and a flow amplifier 23 to be described later. The left and right front wheels 7 respectively are moved in a steering direction by expansion or contraction of the respective steering cylinders 22A and 22B.

Denoted at 23 is the flow amplifier provided between the steering valve 14 and the steering cylinders 22A and 22B. The flow amplifier 23 increases a flow amount of the pressurized oil supplied from the output side passages 19A and 19B of the steering valve 14 to increase an expanding or contracting speed of the steering cylinders 22A and 22B. That is, the flow amplifier 23 is used for enhancing responsiveness of the steering cylinders 22A and 22B when the handle 12 is operated.

Figure 2:
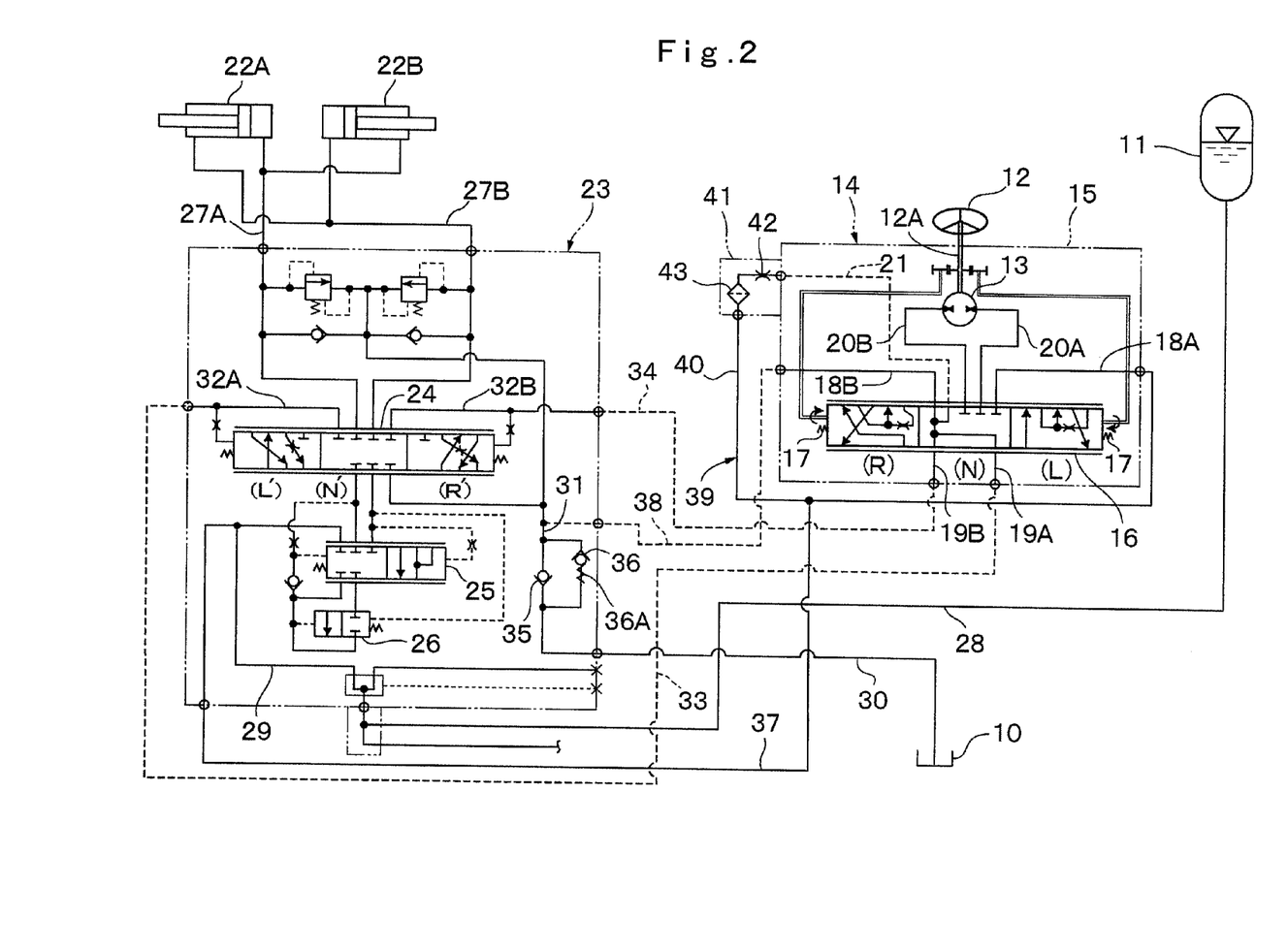
FIG. 2 is a hydraulic circuit diagram for steering applied to the dump truck.

As shown in FIG. 2, the flow amplifier 23 is constituted by including a directional control valve 24 of a hydraulic pilot type having three positions, an on-off valve 25 changing in association with the directional control valve 24, and another on-off valve 26 changing in association with the on-off valve 25. A pair of main lines 27A and 27B are provided between the directional control valve 24 and the steering cylinders 22A and 22B, and the steering cylinders 22A and 22B expand or contract with the pressurized oil supplied or discharged through the main lines 27A and 27B.

As shown in FIG. 2, the flow amplifier 23 is provided with a high pressure side passage 29 connected to the accumulator 11 through a first supply line 28, a low pressure side passage 31 connected to the tank 10 through a discharge line 30 and the like, and a pair of inlet side passages 32A and 32B supplying the pressurized oil introduced from the output side passages 19A and 19B of the steering valve 14 to the directional control valve 24. Here, the directional control valve 24 is controlled to change between a neutral position (N'), and left and right changeover positions (R'), (L') by using the pressurized oil supplied from the inlet side passages 32A and 32B as a pilot pressure.

In this case, as shown in FIG. 2, the inlet side passage 32A is connected to the output side passage 19A of the steering valve 14 through a line 33, and the inlet side passage 32B is connected to the output side passage 19B of the steering valve 14 through a line 34. When the directional control valve 24 is changed from the neutral position (N') to any of the left and right changeover positions (L'), (R') by the pilot pressure supplied from the inlet side passages 32A and 32B, the on-off valve 25 is changed from a blockade position shown in FIG. 2 to a communication position followed by this change, and the on-off valve 26 is also changed from a blockade position to a communication position. At this time, either one of the inlet side passages 32A and 32B is combined and connected to the high pressure side passage 29, and the combined pressurized oil is supplied toward the steering cylinders 22A and 22B through the directional control valve 24 and the main lines 27A and 27B.

Indicated at 35 is a check valve provided in the low pressure side passage 31 of the flow amplifier 23. The check valve 35 is normally closed to prevent the oil liquid in the low pressure side passage 31 from being discharged toward the tank 10. However, the check valve 35 is opened, for example, when the inside of the low pressure side passage 31 is close to a negative pressure to allow the oil liquid in the tank 10 to be resupplied toward the inside of the low pressure side passage 31.

Indicated at 36 is a spring loaded check valve provided along the path in the low pressure side passage 31 to be in parallel to the check valve 35. Here, the spring loaded check valve 36 opens, for example, when a pressure of the oil liquid discharged from a discharge line 38 to be described later toward the tank 10 exceeds a set pressure (for example, 0.5 to 1.1 MPa) of a spring 36A and allows the oil liquid at this time to be discharged toward the tank 10. Other than this, the spring loaded check valve 36 closes to prevent the passing of the oil liquid.

Indicated at 37 is a second supply line for supplying pressurized oil to the steering valve 14. As shown in FIG. 2, the second supply line 37 is connected to the high pressure side passage 29 of the flow amplifier 23. The pressurized oil from the accumulator 11 is supplied to the second supply line 37 through the first supply line 28, the high pressure side passage 29 and the like. Therefore, the second supply line 37 supplies the pressurized oil from the accumulator 11 to the high pressure side passage 18A of the steering valve 14.

Indicated at 38 is a discharge line connected to the low pressure side passage 18B of the steering valve 14, and a front end side of the discharge line 38 is connected to the low pressure side passage 31 of the flow amplifier 23. When the spring loaded check valve 36 opens, the pressurized oil introduced from the low pressure side passage 18B of the steering valve 14 into the discharge line 38 is discharged to the tank 10 through the low pressure side passage 31 and the discharge line 30.

Designated at 39 is a circulation line for circulating an oil liquid from the accumulator 11 to the steering valve 14. As shown in FIG. 2, the circulation line 39 is constituted by a branch line 40 branched from the halfway of the supply line 37, a passage in the orifice joint 41 to be described later, the communication passage 21 in the steering valve 14, passages in the spool valve 16, the low pressure side passage 18B and the discharge line 38.

When the spool valve 16 of the steering valve 14 is in the neutral position (N), the pressurized oil from the accumulator 11 shown in FIG. 2 is supplied to the steering valve 14 through the first supply line 28, the high pressure side passage 29 and the second supply line 37. The pressurized oil supplied to the steering valve 14 is circulated toward the branch line 40 of the circulation line 39, the passage in the orifice joint 41, the communication passage 21 in the steering valve 14, the passages in the spool valve 16 and the low pressure side passage 18B. Further, the oil liquid in the low pressure side passage 18B is discharged to be circulated to the tank 10 from the discharge line 38 through the low pressure side passage 31 of the flow amplifier 23 and the other discharge line 30.

Next, the orifice joint 41 and an orifice portion 42 and a filter 43 which are essential portions in the present embodiment will be explained.

Figure 5:
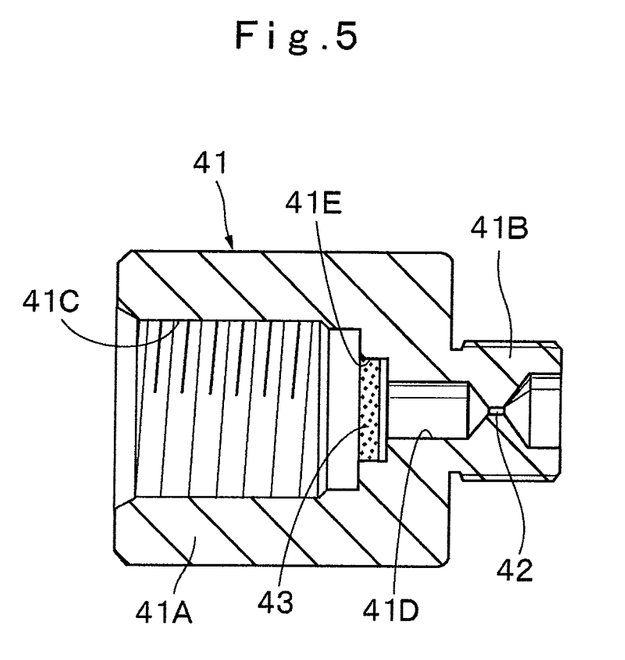
FIG. 5 is a cross-sectional view showing the orifice joint in FIG. 4 as a single unit.
Figure 6:
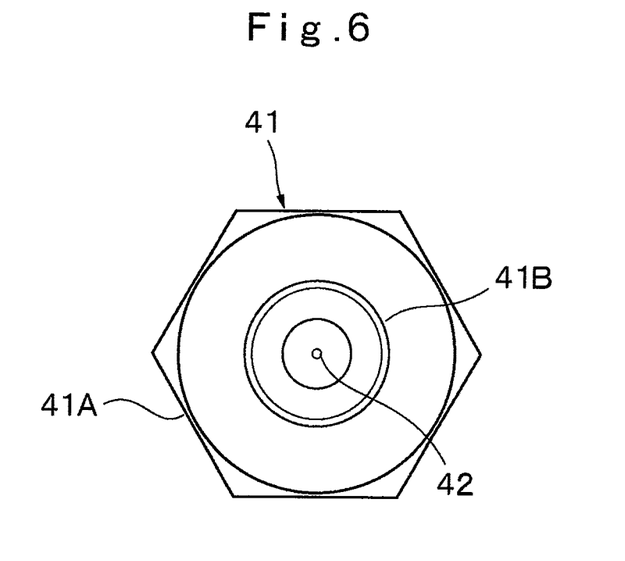
FIG. 6 is a right side view of the orifice joint as viewed from the right side in FIG. 5.

Denoted at 41 is the orifice joint as an orifice member provided along the path of the circulation line 39. As shown in FIG. 4 to FIG. 6, the orifice joint 41 comprises a cylindrical portion 41A which has an outer configuration formed in a hexagonal shape and is open at one side, and a male screw portion 41B in a small diameter integral with the other side of the cylindrical portion 41A. A female screw portion 41C is formed in an inner peripheral side of the cylindrical portion 41A for being screwed into and connected to a front end side of the branch line 40.

A passage hole 41D communicated with the orifice portion 42 to be described later and a filter mounting hole 41E which is formed in a larger diameter than the passage hole 41D and to which the filter 43 is removably mounted from a side of the female screw portion 41C are formed in the cylindrical portion 41A of the orifice joint 41. As shown in FIG. 4, the orifice joint 41 is removably mounted to the housing 15 of the steering valve 14 from outside, and at this time, the male screw portion 41B of the orifice portion 41 is screwed into an open end side of the communication passage 21, thus connecting the orifice joint 41 to the housing 15 of the steering valve 14.

Denoted at 42 is the orifice portion formed in the male screw portion 41B of the orifice joint 41. The orifice portion 42 is constituted by an orifice bore having a minimum bore diameter and a minimum length necessary on a design, where the bore diameter is the degree of 0.5 to 0.6 mm, for example. The orifice portion 42 applies a throttling function to an oil liquid flowing inside to heat the oil liquid with friction. In consequence, the oil liquid heated through the communication passage 21 is circulated in the housing 15 of the steering valve 14.

Denoted at 43 is the filter provided in the orifice joint 41 to be positioned upstream of the orifice portion 42. The filter 43 is removably mounted into the filter mounting hole 41E of the orifice joint 41 from a side of the female screw portion 41C. The filter 43 purifies an oil liquid flowing in the orifice joint 41 and removes foreign objects contained in the oil liquid at upstream of the orifice portion 42. In this manner, the filter 43 prevents clogging of foreign objects from occurring in a side of the orifice portion 42 of the orifice joint 41.

Denoted at 44 is the O-ring as a sealing member. As shown in FIG. 4, the O-ring 44 is provided between the housing 15 of the steering valve 14 and the orifice joint 41 to seal a space therebetween. That is, the O-ring 44 is in advance mounted to an outer peripheral side of the male screw portion 41B of the orifice joint 41 and seals a space between an open end of the communication passage 21 and the orifice joint 41 at the time of screwing the male screw portion 41B of the orifice joint 41 into an open end side of the communication passage 21.

The dump truck 1 according to the present embodiment has the above-mentioned construction and next, an operation thereof will be explained.

Ina stone-crushing site as amine, a large-sized hydraulic excavator (not shown) is used to load crushed stones 4 as objects to be transported on the vessel 3. At this time, the vessel 3 is placed in a transporting position shown in FIG. 1. The dump truck 1 transports and carries the crushed stones 4 to a predetermined cargo collection site in a state where a large number of the crushed stones 4 are loaded on the vessel 3.

In the cargo collection site, when a driver in the cab 6 manually operates an operation lever (not shown), the hoist cylinder 9 is expanded to raise the vessel 3 diagonally backward. Therefore, the crushed stones 4 in the vessel 3 are discharged from the vessel 3 in such a manner as to slide and fall downward.

When discharge of the crushed stones 4 is completed, the hoist cylinder 9 is contracted by a manual operation of the operation lever by a driver. In consequence, the vessel 3 is rotatively driven to the transporting position shown in FIG. 1 and is seated on the vehicle body 2. At this state, the dump truck 1 prepares for the next transporting operation.

Here, when the hydraulic pump constituting the hydraulic pressure source of the dump truck 1 is driven by the engine, a part of the pressurized oil discharged from the hydraulic pump is accumulated in the accumulator 11. The pressurized oil accumulated in the accumulator 11 is supplied into the housing 15 of the steering valve 14 through the first supply line 28, the high pressure side passage 29, the second supply line 37 and the high pressure side passage 18A. Further, the pressurized oil accumulated in the accumulator 11 is supplied also to the steering cylinders 22A and 22B through the flow amplifier 23, and the main lines 27A and 27B.

Incidentally, when the dump truck 1 travels on a road in a job site, a driver in the cab 6 rotatively operates the handle 12 in the right or left direction to turn the dump truck 1 in the right or left direction.

To begin with, an explanation will be made of a case where in a state the dump truck 1 is travelling on a road, a driver in the cab 6 operates the handle 12 to turn the dump truck in the left direction. In this case, when the driver rotatively operates the handle 12 in the left direction, the spool valve 16 of the steering valve 14 is changed from the neutral position (N) shown in FIG. 2 to the left side changeover position (L).

In consequence, in the hydraulic pump motor 13 connected to the handle shaft 12A, the pressurized oil by the accumulator 11 is supplied toward a side of the main passage 20B from the high pressure side passage 18A of the steering valve 14 through the spool valve 16 in the changeover position (L). Therefore, the hydraulic pump motor 13 is driven to be rotated in the left direction by the pressurized oil flowing from a side of the main passage 20B toward a side of the main passage 20A to give a supplementary power in the same direction as the operational direction to the handle 12.

Next, an explanation will be made of a case where a driver in the cab 6 rotatively operates the handle 12 in the right direction. In this case, the spool valve 16 of the steering valve 14 is changed from the neutral position (N) shown in FIG. 3 to the right side changeover position (R). In consequence, in the hydraulic pump motor 13 connected to the handle shaft 12A, the pressurized oil is supplied toward a side of the main passage 20A from the high pressure side passage 18A of the steering valve 14 through the spool valve 16 in the changeover position (R). Therefore, the hydraulic pump motor 13 is driven to be rotated in the right direction by the pressurized oil flowing from the main passage 20A to the main passage 20B to give a supplementary power in the same direction as the operational direction of the handle 12 to the handle 12.

In this manner, when the driver rotatively operates the handle 12 in the right or left direction at a steering operation of the vehicle, the hydraulic pump motor 13 gives the supplementary power in the same direction as the operational direction of the handle 12. Therefore, an operational feeling of the handle 12 can be alleviated.

Meanwhile, in a state where the spool valve 16 of the steering valve 14 is changed from the neutral position (N) to the changeover position (L), the pressurized oil is introduced from the output side passage 19A of the steering valve 14 to the inlet side passage 32A of the flow amplifier 23 through a line 33. In consequence, the directional control valve 24 of the flow amplifier 23 is changed from the neutral position (N') shown in FIG. 2 to the changeover position (L'), and the on-off valve 25 is also changed from the blockade position shown in FIG. 2 to the communication position. Further, the other on-off valve 26 is also changed from the blockade position shown in FIG. 2 to the communication position in response to the right and the left pilot pressures.

Therefore, in the flow amplifier 23, the inlet side passage 32A is combined to the high pressure side passage 29 for connection. The combined pressurized oil is supplied toward the left and right steering cylinders 22A and 22B through the directional control valve 24 in the changeover position (L') and the main line 27A. As a result, the left side steering cylinder 22A is driven in an expanding direction by the pressurized oil from the main line 27A, and the right side steering cylinder 22B is driven in a contracting direction.

On the other hand, in a state where the spool valve 16 of the steering valve 14 is changed from the neutral position (N) to the changeover position (R), the pressurized oil is introduced from the output side passage 19B of the steering valve 14 to the inlet side passage 32B of the flow amplifier 23 through a line 34. In consequence, the directional control valve 24 of the flow amplifier 23 is changed from the neutral position (N') shown in FIG. 2 to the changeover position (R'), and the on-off valve 25 is also changed from the blockade position to the communication position. Further, the other on-off valve 26 is also changed from the blockade position shown in FIG. 2 to the communication position in response to the right and the left pilot pressures.

Therefore, in the flow amplifier 23, the inlet side passage 32B is combined to the high pressure side passage 29 for connection. The combined pressurized oil is supplied to the left and right steering cylinders 22A and 223 through the directional control valve 24 in the changeover position (R') and the main line 27B. As a result, the left side steering cylinder 22A is driven in a contracting direction by the pressurized oil from the main line 27B, and the right side steering cylinder 22B is driven in an expanding direction.

In this manner, the pressurized oil accumulated in the accumulator 11 is supplied to the steering valve 14 through the first supply line 28, the high pressure side passage 29, the second supply line 37 and the high pressure side passage 18A, and is also supplied to the left and right steering cylinders 22A and 22B through the steering valve 14 and flow amplifier 23. In consequence, the steering cylinders 22A and 22B can perform an expanding or contracting operation to move the left and right front wheels 7 in a steering direction.

Meanwhile, when a driver stops the rotational operation of the handle 12, the spool valve 16 is returned to the neutral position (N), the directional control valve 24 of the flow amplifier 23 is returned to the neutral position (N') followed by this, and the on-off valves 25 and 26 are also returned to the blockade position shown in FIG. 2. In consequence, since supply of the pressurized oil to the steering cylinders 22A and 22B is stopped, the steering operation of the front wheel 7 by the steering cylinders 22A and 22B is also stopped.

Incidentally, the dump truck 1 frequently performs a transporting operation in a site where a difference in temperature between morning and evening in a day is large, such as a mine. Therefore, it is necessary to protect the steering valve 14 from a so-called heat shock due to a change of the circumferential temperature. As shown in FIG. 1, in the dump truck 1 provided with a large-sized vehicle, the tank 10 is provided on a side face of the vehicle body 2 and the steering valve 14 is arranged in a bottom side of the cab 6. Therefore, the steering valve 14 is arranged in a position largely away from the tank 10 and a large difference in temperature between a side of the tank 10 and a side of the steering valve 14 tends to easily occur.

Therefore, the present embodiment is provided with the circulation line 39 for circulating the pressurized oil (operating oil) from the accumulator 11 in the housing 15 of the steering valve 14 even when the spool valve 16 of the steering valve 14 is in the neutral position (N) without performing a steering operation of the vehicle. The circulation line 39 is constructed of the branch line 40 of the second supply line 37, the passage in the orifice joint 41, the communication passage 21 in the steering valve 14, the passages in the spool valve 16, the low pressure side passage 18B, and the discharge line 38. The orifice portion 42 of the orifice joint 41 is provided along the path of the circulation line 39.

The orifice portion 42 of the aforementioned orifice joint 41 generates frictional heat by applying the throttling function to the circulating oil liquid even when the spool valve 16 of the steering valve 14 is in the neutral position (N). As a result, the heated oil liquid can flow into the communication passage 21, the passages in the spool valve 16 and the low pressure side passage 18B along an arrow A direction in FIG. 3 to keep the steering valve 14 to be always in a warm state.

Further, in the present embodiment, the orifice joint 41 for applying the throttling function to the oil liquid flowing in the circulation line 39 is removably mounted to the housing 15 of the steering valve 14 from outside. Therefore, when a flow of the oil liquid passing through the orifice joint 41 is deteriorated even by a little due to foreign objects contained in the oil liquid flowing in the circulation line 39, this deterioration can be eliminated by simply removing the orifice joint 41 from the outer side face of the housing 15, preventing the passage of the orifice joint 41 from being clogged by the foreign objects.

Since the orifice joint 41 is provided with the orifice portion 42 and the filter 43, the filter 43 located upstream of the orifice portion 42 can remove the foreign objects contained the oil liquid, preventing the foreign objects from entering into the orifice portion 42. At maintenance of the orifice joint 41, a cleaning operation and the like of the filter 43 may be performed in a state where the orifice joint 41 is removed from the housing 15 of the steering valve 14. The clogging by the foreign objects can be simply prevented and also operability at the maintenance can be improved.

Therefore, according to the present embodiment, also when the spool valve 16 of the steering valve 14 is in the neutral position (N), the oil liquid can be circulated into the housing 15 of the steering valve 14 through the circulation line 39. In this case, an orifice diameter of the orifice portion 42 can be reduced to the degree of 0.5 to 0.6 mm, for example, therefore controlling a flow amount of the oil liquid to the necessary minimum, as well as keeping the inside of the housing 15 of the steering valve 14 to be always in a warm state.

Since the flow amount of the oil liquid passing through the orifice joint 41 can be controlled to the necessary minimum, it is not necessary to increase the capacity of the accumulator 11 in the same way as the conventional art. As a result, the accumulator 11 having the capacity of the necessary minimum can be used, thus achieving the energy saving.

The orifice joint 41 is provided with the cylindrical portion 41A and the male screw portion 41B having a small diameter and can be mounted to the steering valve 14 by screwing the male screw portion 41B into the housing 15 (an open end side of the communication passage 21) of the steering valve 14 from outside. Therefore, the mounting operation and the removal operation of the orifice joint 41 to the steering valve 14 can be performed easily and in a short time. In consequence, the maintenance operation for preventing the passage of the orifice joint 41 from being clogged by the foreign objects can be simply and efficiently performed from an outside of the housing 15.

It should be noted that the above-mentioned embodiment is explained by taking a case where the spool valve 16 having seven ports and three positions is provided in the housing 15 of the steering valve 14, as an example. However, the present invention is not limited to the same, for example, and a spool valve of a type other than the spool valve 16 of this type may be used, and a plurality of directional control valves may be combined. That is, the steering valve adopted in the present invention may be provided with any construction of, at the time of being operated and changed from a neutral position to a changeover position by the operational handle, controlling a direction and a flow amount of pressurized oil supplied to the steering cylinder.

The aforementioned embodiment has explained a case of using the rear wheel drive type dump truck 1 as the transporter vehicle, as an example. However, the present invention is not limited to the same, for example, and the transporter vehicle may be applied to a front wheel drive type dump truck or a four-wheel drive type dump truck driving both front and rear wheels. Further, the transporter vehicle may be applied to a transporter vehicle other than the dump truck equipped with wheels for travelling.

DESCRIPTION OF REFERENCE NUMERALS

1: Dump truck (Transporter vehicle)
2: Vehicle body
3: Vessel (Loading platform)
4: Crushed stones (Objects to be transported)
5: Connecting pin
6: Cab (Operating room)
7: Front wheel
8: Rear wheel
9: Hoist cylinder
10: Operating oil tank (Hydraulic pressure source)
11: Accumulator (Hydraulic pressure source)
12: Steering handle
14: Steering valve
15: Housing
16: Spool valve
17: Plate spring 18A: High pressure side passage
18B, 31: Low pressure side passage (Circulation line)
19A, 19B: Output side passage
20A, 20B: Main passage
21: Communication passage (Circulation line)
22A, 22B: Steering cylinder
23: Flow amplifier
27A, 27B: Main line
28, 37: Supply line
38: Discharge line
39: Circulation line
40: Branch line (Circulation line)
41: Orifice joint (Orifice member)
42: Orifice portion
43: Filter

The invention claimed is:

1. A transporter vehicle comprising:
an automotive vehicle body;
a vessel which is tiltably provided on said vehicle body by using a rear side of said vehicle body as a fulcrum and on which objects to be transported are loaded;
an operating room provided in said vehicle body to be positioned in a front side of said vessel;
a steering handle provided in said operating room and steered by a driver;
a steering valve for controlling a direction and a flow amount of pressurized oil supplied to a steering cylinder at the time of being operated and changed from a neutral position by said steering handle;
a circulation line for circulating the pressurized oil in said steering valve when said steering valve is in the neutral position; and
an orifice member provided along said circulation line to be removably mounted to an outer side face of said steering valve for applying a throttling function to the pressurized oil, said orifice member being screwed into a housing of said steering valve to be mounted thereon to an outside of said housing.

2. A transporter vehicle according to claim 1, wherein said orifice member is constituted by an orifice joint including an orifice portion for applying the throttling function to the pressurized oil, and a filter positioned upstream of said orifice portion to purify said pressurized oil.

3. A transporter vehicle according to claim 1, wherein said steering valve includes a high pressure side passage connected to an accumulator for accumulating the pressurized oil through a supply line, and a low pressure side passage connected to a tank through an exhaust line, and
said circulation line includes a branch line which is branched from said supply line and a front end side of which is connected to said orifice member, said orifice member, a communication passage provided in said steering valve to communicate an inside of said orifice member with said low pressure side passage, and said exhaust line connected to said low pressure side passage for circulating the pressurized oil from said accumulator into said steering valve.

4. A transporter vehicle according to claim 1, wherein a flow amount amplifying valve is provided between an accumulator for accumulating the pressurized oil and said steering cylinder, wherein when said steering valve is changed from the neutral position to a changeover position by the operation of said steering handle, said flow amount amplifying valve is changed from the neutral position to the changeover position using the pressurized oil supplied from an output side passage of said steering valve as a pilot pressure, and
said flow amount amplifying valve combines the pressurized oil supplied from said output side passage of said steering valve and the pressurized oil supplied from said accumulator at the time of being changed from the neutral position to the changeover position and supplies the combined pressurized oil with the increased flow amount toward said steering cylinder through a main line.

* * * * *